Patented Oct. 26, 1943

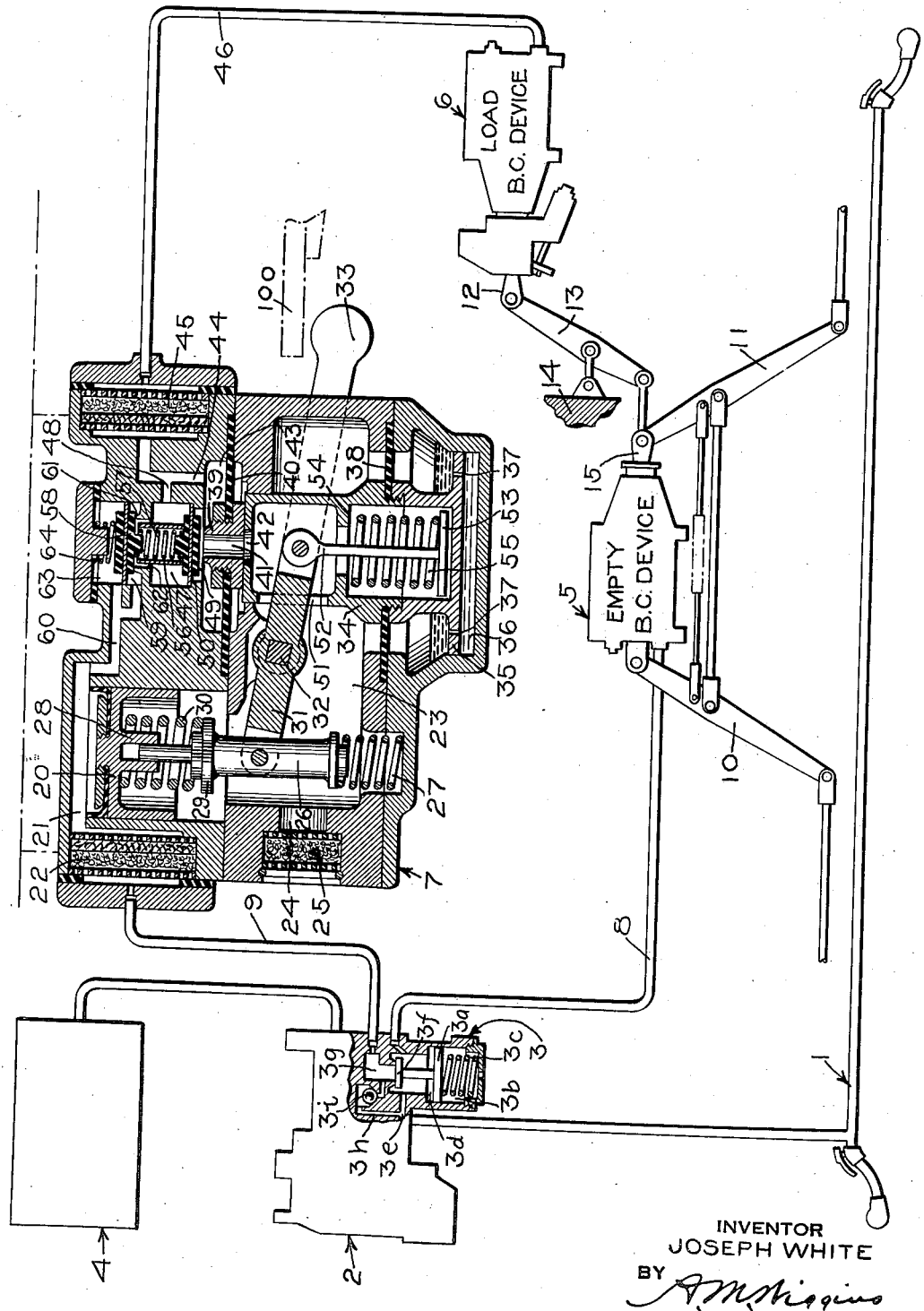

2,332,620

UNITED STATES PATENT OFFICE 2,332,620

AUTOMATIC EMPTY AND LOAD BRAKE EQUIPMENT

Joseph White, Concord, near Sydney, New South Wales, Australia, assignor to The Westinghouse Air Brake Company, Wilmerding, Pa., a corporation of Pennsylvania Application July 22, 1941, Serial No. 403,470
In Australia November 23, 1940

10 Claims. (Cl. 303—23)

This invention relates to means for varying the braking force applied to empty and loaded railway vehicles according to the weight carried by the vehicle.

In the empty and load brake systems wherein a separate brake cylinder is provided for use with empty, and with loaded vehicles, the braking force for the empty vehicle is obtained from a brake cylinder known as the empty brake cylinder and the braking force for the loaded vehicle is obtained from the empty brake cylinder and an additional cylinder known as the load brake cylinder.

The principal object of the invention is to provide means whereby the load brake cylinder of the above type of empty and load brake system is controlled according to the load carried by the vehicle and the action of such load upon the springs of the vehicle in conjunction with the relative positions of a sprung portion of the vehicle with relation to an unsprung portion.

This object is attained by the use of an automatic empty and load device which is constructed and arranged to automatically adjust itself according to the spring deflection of the vehicle during a brake application, and vary accordingly the maximum pressure which can be established in the load brake cylinder. The device has an external lever and is attached to a portion of the vehicle that varies in vertical relationship with another portion of the vehicle (with which the said lever of the device can contact) according to the deflection of the springs thereof which, of course, is proportional to the gross weight of the vehicle.

With an empty vehicle the lever of the device under the influence of pressure supplied from the brake equipment, is adapted to move only a small distance before it abuts on the portion of the vehicle with which it is associated. With the loaded vehicle, however, the added deflection of the springs of the vehicle permits the lever to move a greater distance before it abuts on the portion of the vehicle concerned. The device functions to proportion the air pressure established in the load brake cylinder according to the vehicle spring deflection and the consequent movement of the lever.

Oscillations of the vehicle springs during a brake application is transferred to the lever of the load brake cylinder controlling device, but according to the invention such oscillations are absorbed in the device by means such as springs and by a dash pot piston in such a manner that the operative portions of the device assume a position that represents the mean position of the vehicle springs and, there force, the gross load of the vehicle.

Other objects and advantages will appear in the following more detailed description of the invention.

In the accompanying drawing the single figure is a diagrammatic view of an empty and load brake equipment embodying the invention, a portion of the load brake controlling means being shown in section.

As shown in the drawing, the brake equipment may comprise the usual brake pipe 1, a triple valve device 2, a transfer valve mechanism 3, an auxiliary reservoir 4, an empty brake cylinder device 5, a load brake cylinder device 6 and a load brake controlling device 7.

The triple valve device 2, may be of the usual construction having means subject to the opposing pressures of the brake pipe and auxiliary reservoir, and is operative upon a reduction in brake pipe pressure to admit fluid under pressure from the auxiliary reservoir to the empty brake cylinder device 5 by way of the transfer valve mechanism 3, empty brake cylinder pipe 8, and to also admit fluid under pressure to a pipe 9 leading to the load brake controlling device 7, to effect an application of the brakes as will hereinafter more fully appear. Upon a subsequent increase of brake pipe pressure the triple valve device functions to release fluid under pressure from the empty brake cylinder device and from the pipe 9 to effect the release of the brakes.

The transfer valve mechanism 3 is provided for the purpose of preventing the flow of fluid under pressure to the pipe 9, in effecting an application of the brakes, until the empty brake cylinder pressure has been increased to a chosen pressure, such for instance as fifteen pounds, thus preventing the flow of fluid under pressure to the load brake cylinder device 6 until the empty brake cylinder pressure has been increased enough to cause the empty brake cylinder to function to actuate the usual operatively connected brake levers 10 and 11 and associated brake rods to apply the brake shoes to the vehicle wheels, and until the load brake cylinder push rod 12 has been adjusted to its proper position by the action of load brake lever 13 which is fulcrumed intermediate its ends to a relatively fixed part 14 of the vehicle and which is operatively connected to the push rod 15 of the empty brake cylinder device 5.

Another feature of the transfer valve mechanism is to control the release of fluid from the empty and load brake cylinder devices in releasing the brakes as will hereinafter more fully appear.

The transfer valve mechanism may be of any desired construction but for illustrative purposes is shown as comprising a casing which is integral with the triple valve casing and which is provided with a piston 3a having at one side a chamber 3b in constant open communication with the atmosphere and containing a spring 3c which at all times exerts an upwardly directed force on the piston. At the other side of the piston is a chamber 3d which is in constant open communication with the usual triple valve supply and release passage 3e and which is also in constant open communication with the empty brake cylinder pipe 8. Contained in the chamber 3d, and operatively connected to the piston 3a, is a valve 3f which is normally maintained seated by the action of the spring 3c through the medium of the piston 3a to close a communication between the chamber 3d and a chamber 3g which is constantly open to the pipe 9, the valve of the spring 3c being such that it will require a fluid pressure of around fifteen pounds in chamber 3d to cause the piston 3a to move downwardly and unseat the valve 3f. Connecting the chambers 3g and passage 3e is a by-pass communication extending around the valve 3f, 3h in which communication there is interposed a check valve 3i which prevents flow of fluid from the passage 3e to chamber 3g for purposes which will hereinafter more fully appear.

The load brake controlling device 7 may be carried by either a sprung or unsprung part of the vehicle, but for illustrative purposes is shown mounted on a spring supported part of the vehicle, such for instance, as the load carrying body and may comprise a casing in which there is operatively mounted a control piston 20 having at one side a chamber 21 which is in constant open communication with the pipe 9 by way of an air strainer 22, and having at the other side a chamber 23 which is in constant open communication with the atmosphere through a breather passage 24 having an air strainer 25 interposed therein.

Contained in chamber 23 is a movable plunger 26 which, at one end, rests on a relatively light spring 27 seated in a suitable retaining socket provided in the casing. The other end of the plunger is slidably guided within an annular flange 28 carried by the piston 20, the flange being long enough to provide for a limited relative movement between the plunger and piston. Interposed between and operatively engaging the piston 20 and a spring seat 29 carried by the plunger, is a spring 30 through the medium of which spring the piston may actuate the plunger.

Also contained in the chamber 23 is a lever 31 which is secured, intermediate its ends, to a shaft 32 which is rockably mounted in the casing. One end of this lever is pivotally connected to the plunger 26. This lever, as will hereinafter appear, is operative by the plunger to rock the shaft 32. One end of the shaft extends to the exterior of the casing and has rigidly secured thereto an arm 33 which is adapted to engage a fixed or unsprung part 100 of the vehicle.

Slidably mounted in the casing for movement in the direction opposite to the direction of movement of the plunger 26, is a hollow member 34 which, at its lower end is provided with a circular flange or dash-pot piston 35 which is slidably guided by the inner surface of the wall of the oil containing recess 36 formed in the casing, the oil in the recess being deep enough to cover the flange. The flange is provided with openings 37 which permit the flow of oil from one side of the flange to the other at a rate fast enough to permit slow free movement of the member either upwardly or downwardly under normal operating conditions, which rate, however, will not permit the member to move in either direction at an abnormally fast rate.

The oil recess 36 and the chamber 23 are closed off from each other by an annular flexible diaphragm 38 which has its outer edge clamped between two sections of the casing and has its inner edge clamped between two sections of the hollow member 34, the diaphragm being provided to prevent the loss of oil from the recess 36.

The upper end portion of the member 34 is slidably guided in the casing and engages the lower side of an exhaust valve seat member 39 clamped to the central portion of the flexible diaphragm 40 which is clamped in place by two sections of the casing. The valve seat 39 is provided with a central exhaust passage 41 which, at its lower end, registers with an exhaust passage 42 provided in the upper end of the member 34, which passage 42 is constantly in open communication with the atmospheric chamber 23.

At the upper side of the diaphragm 40 is a chamber 43 which is in constant open communication with the load brake cylinder device 6 by way of a passage 44, a strainer 45 and a pipe 46.

Located directly above the exhaust valve seat 39 and contained in a chamber 47 which is in constant open communication with the diaphragm chamber 40 by way of passage 44 and the branch passage 48, is an exhaust valve 49 which, in its exhaust position, as shown, rests on annular stop shoulder 50 carried by the casing.

The lower face of the exhaust valve 49 is exposed to the chamber 43 and, as will be later described, is adapted to be engaged by the valve seat 39 to cut off communication from the passage 40 and thereby the load brake cylinder device 6 to the atmospheric chamber 23 by way of an opening 51 in the member 34 during a load application of the brake.

One end of the lever 31 has already been described as being operatively connected to the plunger 26 for the purpose of controlling the operation of the lever 31. The other end of the lever extends through the opening 51 in the member 34 to the interior of the member and at its end is operatively connected to the upper end of a member 52 having at its lower end a spring seat 53. Interposed between this spring seat and a spring seat 54 carried by the member 34 is a spring 55, which spring as well as the member 52 are arranged interiorly and axially of the member 34. Between the upper end of the spring 55 and the spring seat 54 a slight clearance is provided for the purpose of permitting a certain limited movement of the arm 33 without the spring exerting an upward force on the member 34. This lost motion action of the spring, as will hereinafter more fully appear is useful only in empty braking.

Seated on the exhaust valve 49 and extending upwardly therefrom is a tubular strut member 56 within which there is disposed a light spring 57 which spring, at its lower end, rests on the exhaust valve and at its upper end, engages a supply valve 58 contained in a chamber 59 which is connected through a passage 60 to the piston chamber 21. This supply valve is adapted to engage a valve seat 61 to cut off a supply communication 62 leading from the chamber 59 to the chamber 47 and thereby to the brake cylinder device 6.

At the upper side of the supply valve 58 is a chamber 63 which is in constant open communication with the passage 60 and which contains a spring 64 adapted to normally seat the supply valve against the opposing pressure of the spring 57. It should here be mentioned that with the supply valve seated there will be clearance between the lower surface of the valve and the upper end of the strut member 56, which clearance will prevent the sleeve from at any time interfering with the seating of the supply valve.

*Application of the brakes with the equipment conditioned for empty car operation*

Assuming the brake pipe, auxiliary reservoir and triple valve device fully charged with fluid under pressure and the vehicle empty, the empty brake cylinder device 5 will be connected to the atmosphere by way of pipe 8, chamber 3d of the transfer valve mechanism 3 and the triple valve passage 3e. The load brake cylinder device 6 is in open communication with the atmosphere by way of pipe 46, strainer 45 of the load brake controlling device 7, passage 44, chamber 40, registering passages 41 and 42, interior of member 34, opening 51 in the member 34, chamber 23, passage 24 and strainer 25.

To effect an application of the brakes the brake pipe pressure is reduced in the usual manner, causing the triple valve device to operate to admit fluid under pressure from the auxiliary reservoir to the empty brake cylinder device 5 by way of the chamber 3d of the transfer valve mechanism 3 and pipe 8. When the pressure of fluid in the empty brake cylinder has increased to about fifteen pounds, the piston 3a of the transfer valve mechanism functions to unseat the valve 3f to admit fluid from chamber 3d to the piston chamber 21 of the load brake controlling device 7 by way of pipe 9 and strainer 22.

The pressure of fluid supplied to chamber 21 causes the piston to move downwardly and, through the medium of the spring 30, the piston forces the plunger 26 in the same direction against the opposing pressure of the spring 27. As the plunger is thus moved it causes the lever 31 and thereby the shaft 21 and arm 33 to be rocked in a counterclockwise direction until the end of the lever 33 is brought to a stop by its engagement with the underside of the unsprung part 100 of the vehicle. The lever, as it is thus moved, raises the member 52 and thereby the spring seat 53 and spring 55 upwardly a slight distance, the movement of the spring taking up the clearance between the upper end of the spring and the spring seat 54. This movement of the spring is such that when the end of the arm 33 is brought to a stop by the fixed part 100 of the vehicle the upper end of the spring will be in contact with the spring seat 54 but will not exert any upward force on the member 34, therefore the supply valve will remain seated and the exhaust valve unseated, so that the empty brake cylinder device 5 alone will control the braking of the empty vehicle.

To effect the release of the brakes, the brake pipe pressure is increased in the usual manner and in response to this increase the triple valve device operates to release fluid under pressure from the empty brake cylinder device 5 and from the piston chamber 21 of the load brake controlling device 7. The flow of fluid from the empty brake cylinder device is by way of the pipe 8, chamber 3d of the transfer valve device 3, passage 3e and the usual exhaust communication established by the usual slide valves of the triple valve device. The flow of fluid from the piston chamber 21 will be by way of the strainer 22, pipe 9, and chamber 3g and passage 3h in the transfer valve device 3, passage 3e and the exhaust communication established by the triple valve device parts. The release of fluid under pressure from the empty brake cylinder device permits the device to function to release the brakes in the usual manner. The release of fluid under pressure from the piston chamber 21 permits the spring 27 to act to move the lever 31 in a clockwise direction, the lever as it is thus moved permitting the plunger 26, spring 30 and piston 20 to assume their normal release positions as shown, and at the same time rocks the shaft 32 so as to move the arm 33 out of engagement with the fixed part 100 of the vehicle.

From the foregoing description of the operation of the brake equipment it will be apparent that the empty brake cylinder device 5 alone will operate to control the application and release of the brakes when the vehicle is empty, the load brake controlling device 7, while operating as above described, will prevent the flow of fluid to the load brake cylinder and will thereby maintain the load brake cylinder device ineffective to in any way contribute to the empty braking.

*Application of the brakes with the equipment conditioned for loaded car operation*

When the vehicle is loaded the load brake controlling device 7 will, due to the compression of the usual vehicle supporting springs, assume a position considerably lower with respect to the fixed part 100 of the vehicle than shown in the drawing. From this it will be seen that as the load on the vehicle body is increased the space between the arm 33 of the load controlling device 7 and the underside of the fixed part of the vehicle will be increased.

Assuming now that the vehicle is loaded heavily enough to require a heavier than empty braking and the brake pipe pressure is reduced to initiate the application of the brakes, the triple valve device 2 functions in response to such reduction to permit fluid under pressure to flow from the auxiliary reservoir to the empty brake cylinder device 5 in the manner hereinbefore described in connection with empty braking.

When the empty brake cylinder pressure has been increased to around fifteen pounds, the empty brake cylinder device will have operated to take up the slack in the brake rigging and cause the brake shoes to engage the vehicle wheels, and, by means of the lever 13 will have also moved the push rod 12 of the load brake cylinder device out to its proper position relative to the latch box mechanism carried by the piston rod of the load brake cylinder device.

Upon the attainment of the pressure of fifteen pounds in the empty brake cylinder device 5, the transfer valve mechanism 3 operates the same as in empty braking to admit fluid under pressure being supplied from the auxiliary reservoir, by the triple valve device, to pipe 9 and thereby to the piston chamber 21 of the load brake controlling device 7.

Fluid under pressure supplied to piston chamber 21 causes the piston 20 and thereby the spring 30 and plunger 26 to move downwardly, the plunger 26 as it is thus moved rocking the lever 31 in a counterclockwise direction and thereby moving the end of the arm 33 upwardly until it is brought to a stop by the engagement of the arm with the fixed part 100 of the vehicle.

The lever 31 as it is thus being rocked, raises the member 52 and thereby the spring seat 53 and spring 55 until the upper end of the spring engages the spring seat 54. The continued movement of the lever causes the spring 55 to exert a considerably upwardly directed force on the member 34 causing the member to move upwardly. Since the upper end of the member 34 is in engagement with the valve seat member 39, upward movement will be imparted to the valve seat member. The valve seat member first seats upon the exhaust valve 49 to close the load brake cylinder exhaust communication between the diaphragm chamber 43 and the exhaust passage 41 in the valve seat member and then moves the exhaust valve upwardly against the opposing pressure of the light spring 57. The member 56 is also moved upwardly by the exhaust valve, which member, when the upper end thereof engages the underside of the supply valve 58, forms a strut whereby the continued upward movement of the release valve will impart upward movement to the supply valve 58, thus unseating the supply valve from its seat 61 against the opposing pressure of the spring 64.

With the supply valve unseated fluid under pressure flows from the supply valve chamber 59 and thereby from the auxiliary reservoir to the load brake cylinder device 6 by way of chamber 47, passages 48 and 44, strainer 45 and pipe 46. Fluid under pressure thus supplied to the load brake cylinder device causes the piston, piston rod and latch box mechanism associated with the piston rod to move outwardly until the latch box mechanism operates into locking engagement with the push rod 12. The piston of the load brake cylinder device acts together with the empty brake cylinder piston to increase the braking force of the brake rigging.

It will here be noted that the greater the distance the arm is spaced from the fixed part 100 of the vehicle the higher the supply valve will be lifted from its seat 61 and the higher the exhaust valve will be raised.

Now as the brake cylinder pressure in chamber 43 and acting on the upward flexed diaphragm 40 of the load brake controlling device 7, the diaphragm and associated valve seat member 39 and member 34 will be forced downwardly against the opposing force of the spring 55 carried by the spring seat 53 which is maintained against downward movement at this time by the piston 20 which is subjected to the pressure of fluid in chamber 21, which pressure is increasing with the load brake cylinder pressure. As the valve seat thus moves downwardly, the spring 65 acts to move the supply and exhaust valves 58 and 49, respectively, strut 56 and spring 57 downwardly. The supply valve when it engages its seat 61 will cut off the supply of fluid under pressure to the load brake cylinder device 6, and since no further increase in load brake cylinder pressure is possible, the downward movement of the flexible diaphragm 40, valve seat member 39 and member 34 will cease and the exhaust valve 49 will be maintained seated on the valve seat member and thereby maintain the load brake cylinder exhaust communication closed. Thus the load brake cylinder pressure is limited according to the weight of the load carried by the vehicle body while the pressure of the empty brake cylinder continues to increase to the full degree called for by the operation of the triple valve device.

It will be understood that the greater the weight of the load on the vehicle the greater will be the distance the supply valve must be moved downwardly to its seated position, consequently the greater will the pressure of the load brake cylinder have to be to compress the spring 55 to permit the valve to seat, thus the braking force of the valves will be proportional to the gross weight of the vehicle.

*Release of the load brake application*

When, in order to release the brakes, the brake pipe pressure has been increased and the triple valve, in response to this increase, has assumed its release position, fluid under pressure is vented from the empty brake cylinder device 5 to the atmosphere by way of pipe 8, transfer valve mechanism 3, passage 3e and the exhaust communication established by the vehicle valve device. At the same time fluid under pressure is vented from the piston chamber 21 and connected supply valve chamber 63 of the load brake controlling device by way of strainer 22, pipe 9, past the open valve 3f of the transfer valve mechanism 3, passage 3e and the triple valve exhaust communication. When the pressure of fluid in valve chamber 63 reduces, due to the flow of fluid therefrom to the amosphere as just described, to a value slightly less than that of the load brake cylinder pressure acting on the underside of the supply valve 58, fluid at the load brake cylinder pressure raises the valve from its seat 61 against the opposing pressure of the light spring 64. Fluid under pressure now flows from the load brake cylinder device 6 to the atmosphere by way of pipe 46, strainer 45, passages 44 and 48, chamber 47 and 48, chamber 47, chamber 54, passage 60, strainer 22, pipe 9, past the open valve 3f of the transfer valve mechanism 3 and the triple valve exhaust communication. It should be noted that fluid under pressure flows from both of the brake cylinder devices by way of the triple valve exhaust communication. Now when the empty and load brake cylinder pressures have been reduced to fifteen pounds, the valve 3f of the transfer valve device is automatically closed by means of the spring 3c, but the flow of fluid from the chamber 51 of the load brake cylinder device will continue by way of the passage 3h which by-passes the valve to the passage 3e and triple valve exhaust communication, which passage 3h as hereinbefore described is provided with a check valve 3i which is adapted to prevent flow through the passage to the pipe 9 and chamber 51 when an application of the brakes is being effected.

When the fluid pressure is vented from the chamber 21, the spring 55 acts to rock the lever 31 in a clockwise direction. This action of the lever together with the action of the compressed spring 27 shifts the plunger 26, spring 30 and piston 20 upwardly to their normal release positions as shown.

When the spring 55 has expanded to its free height there will no longer be any upwardly directed force acting on the member 34, and as a consequence, the member moves downwardly to its normal position as shown, permitting the exhaust valve 40 to move to its normal supported position on the stop shoulder 50, and also permitting the valve seat member 39 to move out of engagement with the exhaust valve. With the exhaust valve in this position, the load brake cylinder device is connected to the atmosphere so that if any air should be trapped in the brake cylinder it will now flow to the atmosphere by way of chamber 23.

When the empty and load brake cylinder devices 5 and 6, respectively, have been depleted of fluid under pressure the usual release springs contained therein will cause the devices to move to their release positions, the latch box mechanism during the release movement of the load brake cylinder piston rod being moved to its push rod releasing position thus permitting the free movement of the brake rigging parts to their brake releasing position as is well known.

*Preventing oscillations between the sprung and unsprung parts of the vehicle from varying the adjustment of the loaded brake controlling device 7*

During an application of the brakes, the arm 33 of the load brake controlling device 7 will remain in contact with the fixed part 100 of the vehicle, so that usual unpreventable oscillations between the sprung and unsprung parts of the vehicle cause the lever 31 to be rocked in one direction or the other. These oscillations are of course very rapid, and while the operation of the lever 31 in response thereto does tend to change the adjustment of the member 34, such adjustment is successfully resisted by the dash-pot action of the piston 35 acting in the oil contained in the recess or dash-pot 36.

When the brakes are released the end of the arm 33 will be spaced away from the fixed part 10 of the vehicle so that oscillations between the sprung and unsprung parts of the vehicle will not cause operation of the arm and associated movable parts of the load controlling device 7, thus relieving these movable parts of undue wear.

*General considerations*

While the invention has been described in connection with an automatic fluid pressure brake equipment in which there is employed a triple valve device it will be understood that it may be employed equally as well in straight air brake equipment or in other types of brake equipments.

It will be understood that while the invention has been described as an empty and load brake equipment it may also be termed a variable load brake equipment since the load brake cylinder pressure may be varied according to variations in the weight of the load carried on the vehicle.

If desired the conditioning of the load brake control apparatus may modify by providing the casing with a stop which the upper face of the supply valve 59 may engage as soon as it is moved far enough from its seat to provide the proper rate of flow of fluid to the load brake cylinder device 6, so that the conditioning movement of the lever 31 will compress the spring 55 and thereby increase its upwardly directed force on the member 34. As soon as fluid in chamber 43 at load brake cylinder pressure becomes sufficient to overcome this spring force the diaphragm 40 will operate to move the member 34 a sufficient distance to permit the supply valve to seat and, with the valve seated, the exhaust valve 49 will remain in engagement with the valve seat member 39 thereby maintaining the load brake cylinder device cut off from the atmosphere. In releasing the brakes the spring 55 will act to move the lever 31 and associated parts to release position and will permit the member 34 to move downwardly to its normal release position in which the valve seat member 39 will be drawn out of seating engagement with the exhaust valve 49.

While one illustrative embodiment of the invention has been shown in detail, it is not my intention to limit its scope to that embodiment or otherwise than by the terms of the appended claims.

Having now described my invention, what I claim as new and desire to secure by Letters Patent, is:

1. The combination with a fluid pressure brake equipment comprising a brake cylinder, means for supplying fluid under pressure to the brake cylinder to effect an application of the brakes, a second brake cylinder device, and means controlled according to the weight of the load on the vehicle for admitting fluid under pressure to said second brake cylinder device to effect an increase in the degree of application of the brakes and for then cutting off the flow of fluid to said second brake cylinder device to limit the increase in the degree of application of the brakes, the flow of fluid to said second brake cylinder device being independent of the operation of the first mentioned brake cylinder device.

2. The combination with the fluid pressure brake equipment comprising a brake cylinder, means for supplying fluid under pressure to the brake cylinder to effect an application of the brakes, of a second brake cylinder device, and means operative to admit fluid under pressure to said second brake cylinder device and operative according to the weight of the load of the vehicle for cutting off the flow of fluid under pressure to said second brake cylinder device to thereby limit the braking power thereof, the control of the flow of fluid to said second brake cylinder device being independent of the operation of the first mentioned brake cylinder device.

3. The combination with a fluid pressure brake equipment comprising a brake cylinder, means for supplying fluid under pressure to the brake cylinder to effect an application of the brakes, of a second brake cylinder device and means operative according to the weight of the load on the vehicle to admit fluid under pressure to said second brake cylinder device and operative according to the weight of the load on the vehicle for cutting off the flow of fluid to said second brake cylinder device and thereby limiting the braking power thereof, the flow of fluid to said second brake cylinder device being independent of the operation of the first mentioned brake cylinder device.

4. In a fluid pressure brake equipment, in combination, an empty brake cylinder device for providing braking power on a lightly loaded vehicle and a load brake cylinder device adapted to be cut into operation to provide increased braking power on the vehicle when the vehicle is more heavily loaded, said vehicle having an unsprung or relatively fixed part, load brake cylinder control apparatus movable vertically relative to the unsprung part of the vehicle different distances depending upon differences in the weight of the load carried by the vehicle and being adjustable to admit fluid under pressure to the load brake cylinder device and to limit the amount of fluid under pressure admitted to the load brake cylinder device, said control apparatus comprising adjusting means movable into abutting engagement with the unsprung part of the vehicle for determining the adjustment of the control apparatus, and means for actuating the adjusting means.

5. In a fluid pressure brake equipment, in combination, an empty brake cylinder device for providing braking power on a lightly loaded vehicle and a load brake cylinder device adapted to be cut into operation to provide increased braking power on the vehicle when the vehicle is more heavily loaded, said vehicle having an unsprung or relatively fixed part, load brake cylinder control apparatus movable vertically relative to the unsprung part of the vehicle different distances depending upon differences in the weight of the load carried by the vehicle and being adjustable to admit fluid under pressure to the load brake cylinder and to limit the amount of fluid under pressure admitted to the load brake cylinder, said brake control apparatus comprising a normally seated valve operative to control the flow of fluid to the load brake cylinder device, means movable to first unseat said valve and to then engage an unsprung part of the vehicle to condition the apparatus for operation to limit the amount of fluid under pressure admitted to the load brake cylinder device, and fluid pressure responsive means operative upon the initiation of a brake application for moving the valve controlling means into engagement with the unsprung part of the vehicle.

6. In a fluid pressure brake equipment, in combination, an empty brake cylinder device for providing braking power on a lightly loaded vehicle and a load brake cylinder device adapted to be cut into operation to provide increased braking power on the vehicle when the vehicle is more heavily loaded, said vehicle having an unsprung or relatively fixed part, load brake cylinder control apparatus movable vertically relative to the unsprung part of the vehicle different distances depending upon differences of weight of the load carried by the vehicle and being adjustable to admit fluid under pressure to the load brake cylinder device and to limit the amount of fluid under pressure admitted to the load brake cylinder device, said load brake control apparatus comprising adjusting means movable a distance proportional to the degree of relative movement between the apparatus and fixed part of the vehicle to adjust the apparatus for operation to limit the load brake cylinder pressure, and means operative by fluid under pressure supplied to the load brake control apparatus in effecting an application of the brakes for actuating said adjusting means.

7. In a fluid pressure brake equipment, in combination, an empty brake cylinder device for providing braking power on a lightly loaded vehicle and a load brake cylinder device adapted to be cut into operation to provide increased braking power on the vehicle when the vehicle is more heavily loaded, said vehicle having an unsprung or relatively fixed part, load brake cylinder control apparatus movable vertically relative to the unsprung part of the vehicle different distances depending upon differences in the weight of the load carried by the vehicle and being adjustable to admit fluid under pressure to the load brake cylinder device and to limit the amount of fluid under pressure admitted to the load brake cylinder device, said control apparatus comprising adjusting means movable into abutting engagement with the unsprung part of the vehicle for determining the adjustment of the control apparatus, means for actuating the adjusting means, and means for stabilizing said apparatus against accidental movement due to service shocks which may be transmitted thereto through the medium of the adjusting means when the adjusting means is in engagement with said unsprung part of the vehicle.

8. In a brake equipment, in combination, means for providing braking power on a lightly loaded vehicle and means adapted to be cut into operation to provide increased braking power on the vehicle when the vehicle is more heavily loaded, means governed by the weight of the load on the vehicle for limiting the braking power of the second mentioned means, and means operative independently of the operation of the first mentioned means upon a predetermined increase in the braking power of the first mentioned means for cutting the last mentioned means into action.

9. In a brake equipment, in combination, means for providing braking power on a lightly loaded vehicle and means adapted to be cut into operation to provide increased braking power on the vehicle when the vehicle is more heavily loaded, means governed by the weight of the load on the vehicle for cutting the second mentioned means into action and for limiting the braking power of the second mentioned means, and means operative independently of the operation of the first mentioned means upon a predetermined increase in the braking power of the first mentioned means for cutting the last mentioned means into action.

10. In a fluid pressure brake equipment, in combination, an empty brake cylinder device for providing braking power on a lightly loaded vehicle and a load brake cylinder device adapted to be cut into operation to provide increased braking power on the vehicle when the vehicle is more heavily loaded, means governed by the weight of the load on the vehicle for cutting said load brake cylinder device into action and for limiting the braking power of the load brake cylinder device, and means operative independently of the operation of the empty brake cylinder device upon an increase in empty brake cylinder pressure for cutting said means into action.

JOSEPH WHITE.